UNITED STATES PATENT OFFICE.

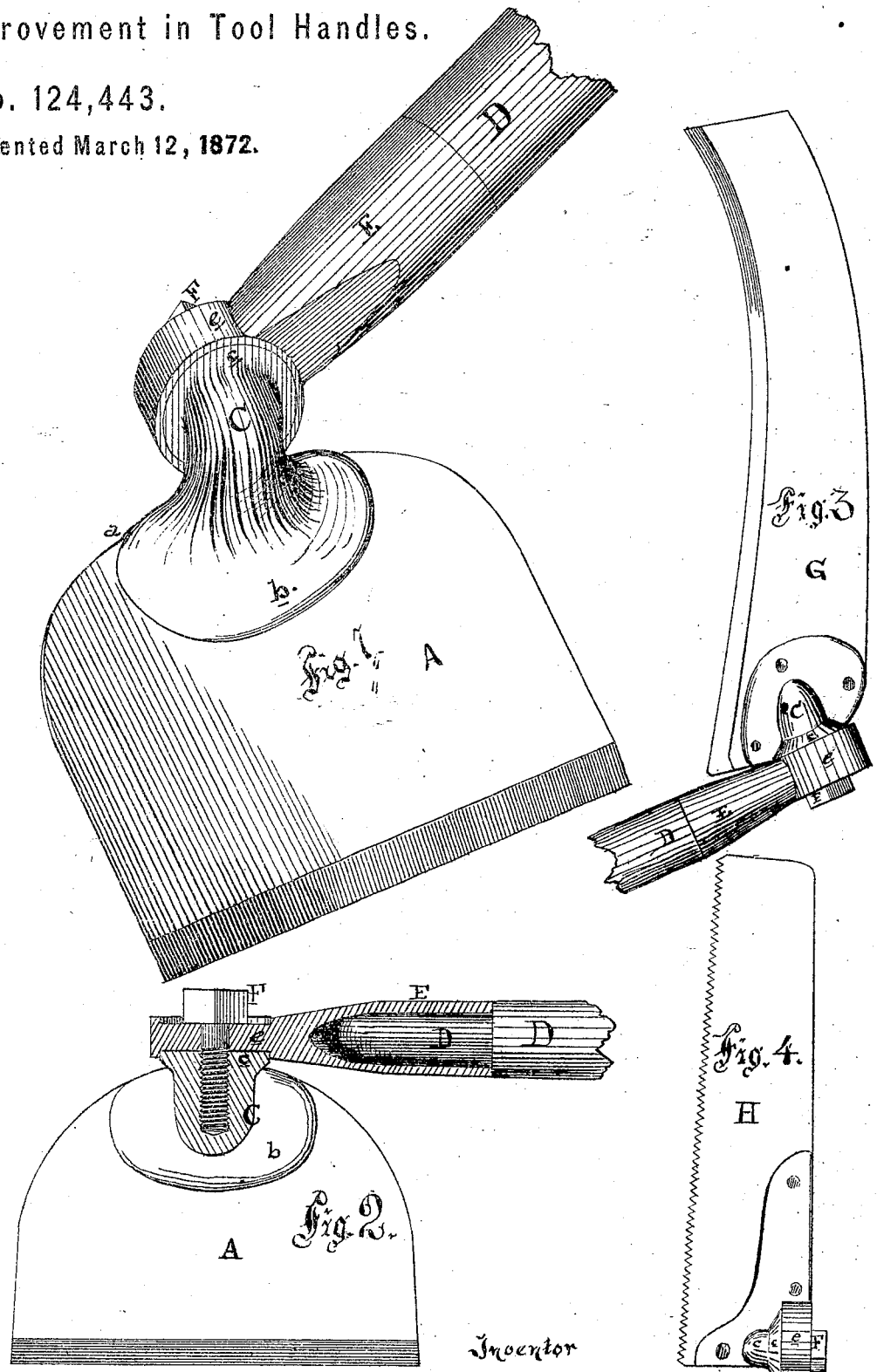

WARREN M. KNIGHT, OF GREENFIELD, MASSACHUSETTS.

IMPROVEMENT IN TOOL-HANDLES.

Specification forming part of Letters Patent No. 124,443, dated March 12, 1872.

*To all whom it may concern:*

Be it known that I, WARREN M. KNIGHT, of Greenfield, in the county of Franklin, and State of Massachusetts, have invented a new and useful Improvement in Tool-Handles; and I do hereby declare the following to be a full, clear, and exact description of the same, reference being had to the accompanying drawing, in which—

Figure 1 is a perspective view of my invention. Fig. 2 is a longitudinal section through the handle of the same. Figs. 3 and 4 represent modifications of my invention.

My invention relates to a method of attaching cutting-blades to their handles, so that said blades may be adjusted at any desired lateral angle to the axis of the blade, to enable the blade to strike in one plane while the handle is oblique thereto.

That others may fully understand my invention I will particularly describe it.

A is the blade, which is represented as a chopper in Figs. 1 and 2. It may be forged entire, though I find it advantageous to make the same of sheet-steel set upon a cast-iron head, $b$, as shown. When so made the head $b$ is constructed with a shoulder or ridge, $a$, against which the upper edge of the blade rests. This shoulder receives the stress of the blow when the chopper is in use, and relieves the rivets which unite the blade and head from the shearing strain. The head $b$ is constructed with a shank or neck, C, which is curved sidewise so as to set the blade off from the handle a little way, and by that means objects may be avoided which would otherwise obstruct the handle during the use of the implement. The upper end of the neck C is expanded to form a broad flat disk, $c$, and thereby secure a firm bearing against the handle, to prevent displacement in any direction. At the end of the handle D I place a strong cast-iron socket, E, having a flattened end, $e$, to receive the disk $c$, and the two are held together by a screw-bolt, F, which passes through the head $e$ and enters a female screw in C. The part $e$ is surfaced with a suitable tool, and is recessed slightly, as shown. The disk $c$ on the head C is likewise surfaced, and fitted to the recess in the part $e$, so that no shearing strain can effect the bolt. By the arrangement and construction of parts described above, great strength and rigidity are secured. In place of the chopping-blade A, a cutting-blade, G, a saw, H, or other convenient or desirable pruning instrument may be adapted to the handle D; every such instrument being provided with a neck and disk, like C and $c$. The chopping-blade A may be usefully employed in clearing away brush-wood, cutting corn-stalks, tobacco, &c.

Having described my invention, what I claim as new is—

An implement for pruning trees, &c., composed of a handle, D E, provided with a recessed seat, $e$, as described, combined with a blade provided with a shank, C $c$, fitted to said seat, as described, and for the purpose set forth.

WARREN M. KNIGHT.

Witnesses:
JOSEPH KING,
J. H. ROBERTS.